US007307526B2

(12) United States Patent
Rajapakse et al.

(10) Patent No.: US 7,307,526 B2
(45) Date of Patent: Dec. 11, 2007

(54) FEDERATED SYSTEM FOR MONITORING PHYSICAL ASSETS

(75) Inventors: Ravindra U. Rajapakse, San Francisco, CA (US); David L. Shannon, State College, PA (US); Leo S. Chang, San Carlos, CA (US); Stephen J. Lambright, San Francisco, CA (US); Christopher A. Stephenson, Redwood City, CA (US); Andrew E. S. Alcock, Singapore (SG); Jeyappragash Jeyakeerthi, Santa Clara, CA (US); Gregory Y. H. Lee, Singapore (SG)

(73) Assignee: Savi Technology, Inc., Mountain View, CA (US)

( * ) Notice: Subject to any disclaimer, the term of this patent is extended or adjusted under 35 U.S.C. 154(b) by 173 days.

(21) Appl. No.: 10/845,367

(22) Filed: May 12, 2004

(65) Prior Publication Data

US 2005/0156736 A1 Jul. 21, 2005

Related U.S. Application Data

(63) Continuation-in-part of application No. 10/821,296, filed on Apr. 8, 2004, now Pat. No. 7,129,837.

(60) Provisional application No. 60/470,294, filed on May 13, 2003.

(51) Int. Cl.
 *G08B 23/00* (2006.01)
 *G08B 21/00* (2006.01)

(52) U.S. Cl. ............... 340/572.1; 340/568.1; 340/540; 340/5.1

(58) Field of Classification Search ............... None
See application file for complete search history.

(56) References Cited

U.S. PATENT DOCUMENTS

| 4,688,244 A | 8/1987 | Hannon et al. |
| 4,750,197 A | 6/1988 | Denekamp et al. |
| 5,565,858 A | 10/1996 | Guthrie |
| 5,835,012 A | 11/1998 | Wilk |
| 5,892,441 A | 4/1999 | Woolley et al. |

(Continued)

OTHER PUBLICATIONS

Notification Of The International Search Report Or The Declaration and Written Opinion Of The International Searching Authority, PCT/US04/14206, Apr. 28, 2005, 9 pages.

(Continued)

*Primary Examiner*—Julie Bichngoc Lieu
(74) *Attorney, Agent, or Firm*—Fenwick & West LLP

(57) ABSTRACT

A system federates heterogeneous monitoring systems to provide end-to-end monitoring information for conveyances with item-layer visibility. A first node of the federated system comprises a first monitoring system and a first port and a second node comprises a second monitoring system and a second port. In parallel with a conveyance being transported between the first node and the second node, the first monitoring system sends an agent to the second monitoring system. The agent comprises logic and/or data necessary to implement processes on the second monitoring agent while the conveyance is at the second port. When the conveyance arrives at the second port, the second monitoring system executes the agent to determine conditions of the conveyance and/or its contents.

26 Claims, 6 Drawing Sheets

U.S. PATENT DOCUMENTS

| | | |
|---|---|---|
| 5,959,568 A | 9/1999 | Woolley |
| 6,148,291 A | 11/2000 | Radican |
| 6,662,068 B1 | 12/2003 | Ghaffari |
| 6,714,121 B1 | 3/2004 | Moore |
| 6,804,578 B1 | 10/2004 | Ghaffari |
| 6,820,805 B2 | 11/2004 | Stevens |
| 6,927,687 B2 | 8/2005 | Carrender |
| 2001/0018672 A1 | 8/2001 | Petters et al. |
| 2002/0029178 A1 | 3/2002 | Wiederin et al. |
| 2003/0125980 A1 | 7/2003 | Ribeiro |
| 2003/0227382 A1* | 12/2003 | Breed ............... 340/539.13 |
| 2004/0100379 A1 | 5/2004 | Boman et al. |
| 2004/0153344 A1 | 8/2004 | Bul et al. |
| 2004/0177032 A1 | 9/2004 | Bradley et al. |
| 2005/0109845 A1 | 5/2005 | Ghaffari |
| 2005/0110636 A1 | 5/2005 | Ghaffari |
| 2005/0288937 A1 | 12/2005 | Verdiramo |

OTHER PUBLICATIONS

Notification of Transmittal of the international Search Report and the Written Opinion of the International Searching Authority, or the Declaration, PCT Application No. PCT/US04/15166, Sep. 6, 2005, 6 pages.

International Search Report and the Written Opinion, PCT/US04/41501, Nov. 3, 2005, 11 pages.

Notification of Transmittal of the International Search Report and the Written Opinion, PCT/US04/14192, Jan. 18, 2006, 8 pages.

Notification of the International Search Report and Written Opinion, PCT/US04/11086, Sep. 5, 2006, 10 pages.

\* cited by examiner

FEDERATED SYSTEM FOR MONITORING PHYSICAL ASSETS

CROSS REFERENCE TO RELATED APPLICATIONS

This application: claims priority under 35 U.S.C. § 119 (e); U.S. Provisional Application No. 60/470,294 filed May 13, 2003, entitled "Global Supply Chain Federation," by David Shannon; claims priority under 35 U.S.C. § 120 as a continuation-in-part to U.S. patent application Ser. No. 10/821,296 filed Apr. 8, 2004, now U.S. Pat. No. 7,129,837, entitled "Continuous Security State Tracking for Intermodal Conveyances Transported Through a Global Supply Chain," by David Shannon et al.; and is related to U.S. patent application Ser. No. 10/841,368, entitled "Nested Visibility for a Conveyance Hierarchy," by Stephen J. Lambright et al.; and is related to U.S. patent application Ser. No. 10/841,407, entitled "State Monitoring of a Container," by Stephen J. Lambright et al.

BACKGROUND OF THE INVENTION

1. Field of the Invention

This invention relates generally to monitoring conveyances and/or their contents and, more specifically, to monitoring physical assets through a network of heterogeneous monitoring systems.

2. Background Art

Ever-increasing global trade underscores a modern global economy which depends on goods transported in a global supply chain. Generally, a global supply chain is a network of international suppliers, manufacturers, distributors, and other entities that handle goods from their component parts to consumer consumption. For example, semiconductor testing equipment is exported from the United States to Taiwan, where semiconductors are processed and then sent to Malaysia for assembly into computers. Subsequently, the computers are shipped to warehouses in the United States, and ultimately, to consumer outlets for consumption.

However, heterogeneous monitoring systems along the global supply chain make end-to-end tracking difficult. These monitoring systems are often owned and operated by different non-cooperating entities. Additionally, conventional monitoring systems can run different types of software or different versions of the same software, use proprietary protocols, and the like, thereby making them unable to easily exchange necessary information. Due to such characteristics, a single monitoring system loses visibility in incompatible "blind spots."

Moreover, a shipper and consignee have little or no control over conveyances and/or their contents en route through the global supply chain. Consequentially, nonuniform security standards, physical handling, environmental conditions, logistical information collection, and the like, are susceptible to a lowest common denominator. Conversely, checkpoints within the global supply chain have little or no information about conveyances and/or their contents that they are handling. Generally, goods are not visible as they are nested within several layers of other conveyances. An operator must rely on information written directly on the conveyance, or log-in to a central database. Thus, checkpoints are not able to automatically discern certain conditions about conveyances. Nor are shippers or consignees able to easily send or receive updates on conveyance conditions from checkpoints.

Therefore, what is needed is a robust monitoring system capable of monitoring conveyances and/or their contents across heterogeneous monitoring systems. There is also a need to control the processing of conveyances and/or their contents while present in the heterogeneous monitoring system.

SUMMARY OF THE INVENTION

The present invention meets these needs with a system and method to monitor conveyances and/or their contents through heterogeneous monitoring systems. The system federates the heterogeneous monitoring systems to provide end-to-end monitoring information for conveyances with item-layer visibility. The system can automate monitoring steps by using automatic identification technologies such as RFID (Radio Frequency IDentification) tags on the conveyances and their contents. Furthermore, the system extends control of processing into the heterogeneous monitoring systems in order to, for example, implement standardized procedures, remotely access conditions, update routing information, and the like.

In some embodiments, a first node comprises a first monitoring system and a first port, and a second node comprises a second monitoring system and a second port. In parallel with a conveyance being transported between the first node and the second node, the first monitoring system sends an agent to the second monitoring system. The agent comprises logic and/or data necessary to implement processes on the second monitoring agent while the conveyance is at the second port. When the conveyance arrives at the second port, the second monitoring system executes the agent to determine conditions of the conveyance and/or its contents. The agent can send execution results back to the first monitoring system.

In some embodiments, a federation directory stores information from the first monitoring system and provides look-ups for the second monitoring system. When the conveyance is prepared for shipping from the first port, the first monitoring system can upload information correlating a conveyance with an owner, a tag with a conveyance, a conveyance with a tag, and the like. When an unknown conveyance arrives at the second port, the second monitoring system can retrieve identification information from the conveyance in order to retrieve ownership information from the federation directory. Then, the second monitoring system can request an agent from the first monitoring system.

In some embodiments, the first monitoring system sends a master agent to the next node of a route, and slave agents to all nodes of the route. The master agent can be immediately executable and include permissions such as writing data to the conveyance tag. The slave agent can be a passive agent that is pre-loaded, but not executable without a master agent. Thus, the nodes pass the master agent to next nodes or return it to the first monitoring system for distribution.

In some embodiments, the monitoring systems comprise an agent management module to generate and distribute modules. The agent management module associates information such as the tag identification information with the conveyance, encapsulates the data and sends it to the federation directory. The agent management module can also generate an agent equipped with necessary logic and/or data to remotely process the conveyance. Subsequently, the agent management module can update the agent to reflect changes in policy such as a change in routing or a change in destination. In some embodiments, the monitoring systems further comprise an agent execution module to safely execute received agents. The agent execution module controls an agent's execution and protects the monitoring system. For example, the agent execution module can limit processor cycles available to agent threads, partition memory usage, and prevent malicious code from harming native data.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

A system and method for monitoring a conveyance and/or its contents across heterogeneous monitoring systems is disclosed. A system according to some embodiments of the present invention is set forth in FIGS. 1-4, and methods operating therein, according to some embodiments of the present invention, are set forth in FIGS. 5-6.

The accompanying description is for the purpose of providing a thorough explanation with numerous specific details. Of course, the field of conveyance monitoring is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripting code.

Figure 1:
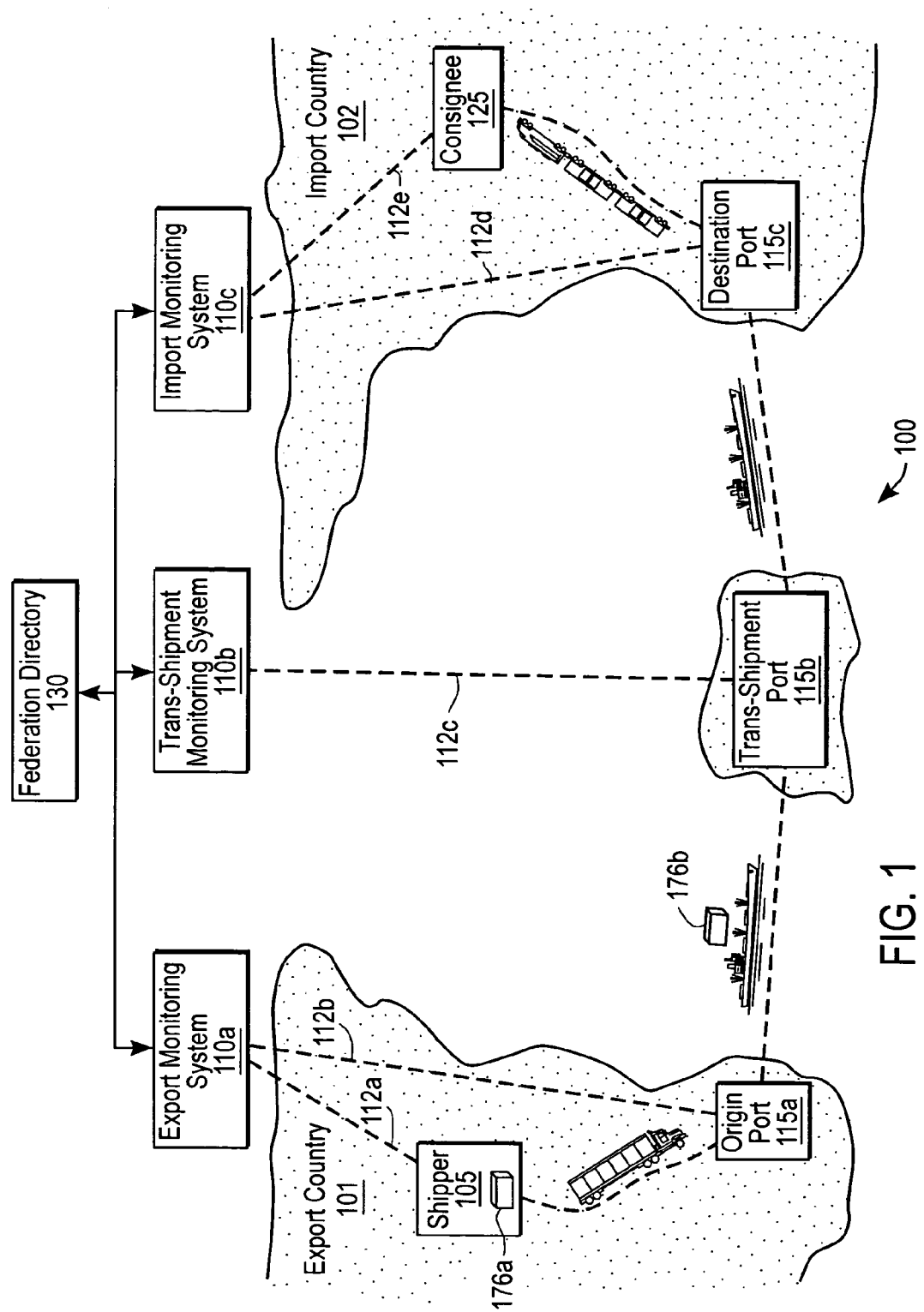
FIG. 1 is a schematic diagram illustrating a federated global supply network in according to one embodiment of the present invention.

FIG. 1 is a block diagram illustrating a federated monitoring system 100 according to one embodiment of the present invention. The federated monitoring system 100 comprises a heterogeneous monitoring systems (collectively 110a, 110b, 110c) and a federation directory 130 in communication with a global supply chain (collectively 105, 115a-c, 125). The heterogeneous monitoring systems comprise an export monitoring system 110a, a trans-shipment monitoring system 110b, and an import monitoring system 110c. The global supply chain comprises a shipper 105, an origin port 115a, a trans-shipment port 115b, a destination port 115c, and a consignee 125. Note that the heterogeneous monitoring systems and the global supply chain can have various configurations within the scope and spirit of the present invention. For example, the global supply chain can alternatively comprise, for example, a distribution center, a rail terminal, a warehouse, a manufacturing plant, a retail store, and the like.

In general, the federated monitoring system 100 distributes agents through the heterogeneous monitoring systems to process physical assets as they arrive at nodes therein. A physical asset can comprises any layer of the ISO (International Standards Organization) logistical layers including an item layer, a packaging layer, a carton layer, a unit load layer, a container layer, a vehicle layer, and the like. The physical asset can also comprise a non-standardized asset such as a good or a conveyance for transporting goods. Note that conveyances 176a,b is used herein as a representative physical asset but that any of the listed physical assets can be substituted. The conveyances are equipped with automatic identification technology such as an RFID (Radio Frequency IDentification) tag or other device to store and provide identification information. In one embodiment, several conveyances 176a,b can be nested within an outer conveyance. A conveyance 176a,b at any layer of the nesting can provide visibility of the item layer to the monitoring system 100. In another embodiment, the conveyance 176a,b is equipped with a state device making it self-aware and, thus, capable of determining its own condition in blind spots and reporting the condition to the federated monitoring system 100.

At a high-level, the shipper 105 transports a conveyance 176a,b to the consignee 125 via one of many trade routes, only one of which is shown in the example of FIG. 1. As a first mode of transportation, a truck transports the conveyance 176a,b from the shipper 105 to the origin port 115a. As a second and a third mode of transportation, a first vessel and a second vessel transport the conveyance 176a,b from the origin port 115a to the destination port 115c with a transfer at a trans-shipment port 115b. As a fourth mode of transportation, a freight train transports the conveyance 176a,b to the consignee 125.

The global supply chain is a network of international suppliers, manufacturers, distributors, and other entities that handle conveyances from their component parts to consumer consumption. The shipper 105 and the consignee 125 can be direct or indirect partner entities or units within a single entity exchanging a conveyance 176a,b though a trade route. For example, a manufacturer sends computer components to an assembly plant by truck freight, which in turn ships assembled computers to a warehouse. The origin and destination ports 115a-b can be a shipping dock, an airport, a customs agency, an NVOCC (Non-Vessel Operating Common Carrier) or any other entity that sends and/or receives goods over a trade route. A representative port 115 is described in greater detail below with respect to FIG. 4. An internal supply chain is a similar network operated by a single entity or closely-associated entities.

In the federated monitoring system 100, the export monitoring system 110a monitors the conveyance 176a,b from the shipper 105 to the origin port 115a, and then hands-off monitoring to the trans-shipment monitoring system 110b. In turn, the trans-shipment monitoring system 110b monitors the conveyance at the trans-shipment port 115b, and then hands-off monitoring to the import monitoring system 110c to monitor the conveyance 176a,b from the destination port 115c to the consignee 125. In one embodiment, the monitoring systems 110a-c overlap coverage to ensure continuity in monitoring. In another embodiment, hand-offs between monitoring systems 110a-c comprise exchanging an agent as described below with reference to FIG. 2.

The monitoring systems 110a-c monitor the conveyance 176a,b for conditions such as environmental conditions, logistical and location conditions, security and physical conditions, and the like. Environmental conditions can relate to conditions such as temperature, humidity, shock, and the like. Logistical and location conditions can relate to timing, whether a conveyance is in the right place, and the like. Also, security and physical conditions can relate to whether a bolt seal on the conveyance has been opened or tampered with, whether the conveyance 176a,b or its contents are physically damaged, and the like. The monitoring systems 110a-c can use logic implemented, for example, with state machines to determine the conditions. Monitoring systems 110a-c determine desired logical processes and/or data needed to generate an agent as driven by specific needs of the conveyance 176a,b.

For example, if the conveyance 176a,b contains hazardous materials that should be handled by certain agents, the monitoring systems 110a-c can supply the agent with logic or software code necessary to provide ultra-secure authorization and/or data including types of authorized agents or specifically authorized agents. In another example, a company desiring to ensure that minimum security procedures are met across a system can generate an agent with security state logic and data. The agent can interrogate the conveyance 176a,b to ensure that the seal has remained closed. The agent can also retrieve a self-determined security state from the conveyance 176a,b and send the results back an owner of the agent. In yet another example, the agent can apply business rules against manifest data ensuring that the conveyance 176a,b inventory can be accounted for. In still another example, the agent can update routing information for the conveyance such as a change in destination. The monitoring systems 110a-c comprises, for example, one or more personal computers, workstations, server blades, and the like. A representative monitoring system 110 is described further below with reference to FIG. 3.

The federation directory 130 provides a look-up service across independently-operated monitoring systems to identify conveyances 176a,b within their purview. When the export monitoring system 110a generates agents, it can also send enough information to the federation directory 130 for the trans-shipment or import monitoring systems 110b-c to match agents with unidentified conveyances. The federation directory 130 stores information in tables using a common format accessible across registered systems to ensure interoperability. The information can vary to correlate, for example, the conveyance 176a,b with an owner, a tag with an owner, a tag with a conveyance, the conveyance 176a,b with a tag, and the like. When the trans-shipment or import monitoring systems 110b-c detect an unidentified conveyance, they can interrogate the conveyance for a federation identification. The federation directory 130 allows the trans-shipment or import monitoring systems 110b-c to request an agent from the unidentified conveyance owner for processing.

The communication lines 112a-e provide data communication between the monitoring systems 110a-c and ports 115a-c within the global supply chain. The communication lines 112a-e can be enabled by, for example, a wired or wireless network connection such as the Internet, a satellite, a telephone line, and the like. Preferably, communication lines 112a-e enable tightly coupled and secure hand-offs using, for example, encryption, secure protocols such as HTTPS, and the like. Similar communication lines can be used for inter-monitoring system 110a-c communication.

Figure 2:
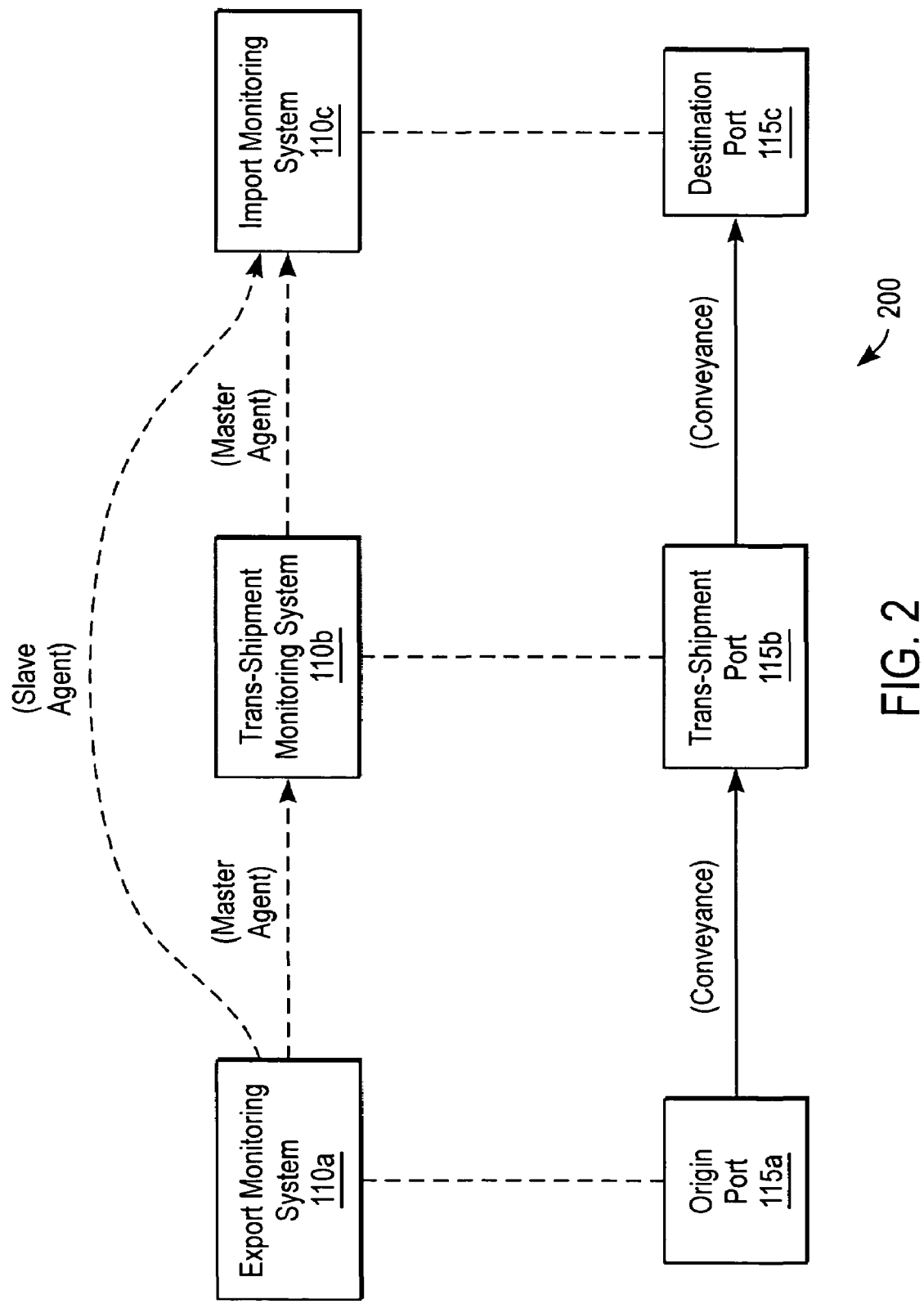
FIG. 2 is a block diagram illustrating interactions between heterogeneous monitoring systems of the federated global supply network according to one embodiment of the present invention.

FIG. 2 is a block diagram illustrating interactions between the heterogeneous monitoring systems 110a-c according to one embodiment of the present invention. A vessel transports a conveyance from the origin port 115a to the trans-shipment port 115b, and then to the destination port 115c. In a parallel manner, the federated monitoring system 100 sends a master agent from the export monitoring system 110a to the trans-shipment monitoring system 110b, and then to the import monitoring system 110c. Such coexistence allows the export monitoring system 110a to control processing of the conveyance and its contents on the trans-shipment and import monitoring systems 110b-c.

In one embodiment, the master agent is sent to a next node and then to subsequent nodes along with the conveyance, while the slave agent is sent to each node in advance of the conveyance. The master agent can be immediately executable and include permissions such as permission to write to the conveyance tag. By contrast, the slave agent can be a passive agent that is pre-loaded for efficiency, but is not executable without the master agent. Additionally, the slave agent can report a failure of the conveyance to reach the node. In one embodiment, the slave agent is valid for a limited time and, if expired, is refreshed upon arrival of the master agent. In another embodiment, the trans-shipment and import monitoring systems 110b-c can request the master agent upon arrival of the conveyance.

Figure 3:
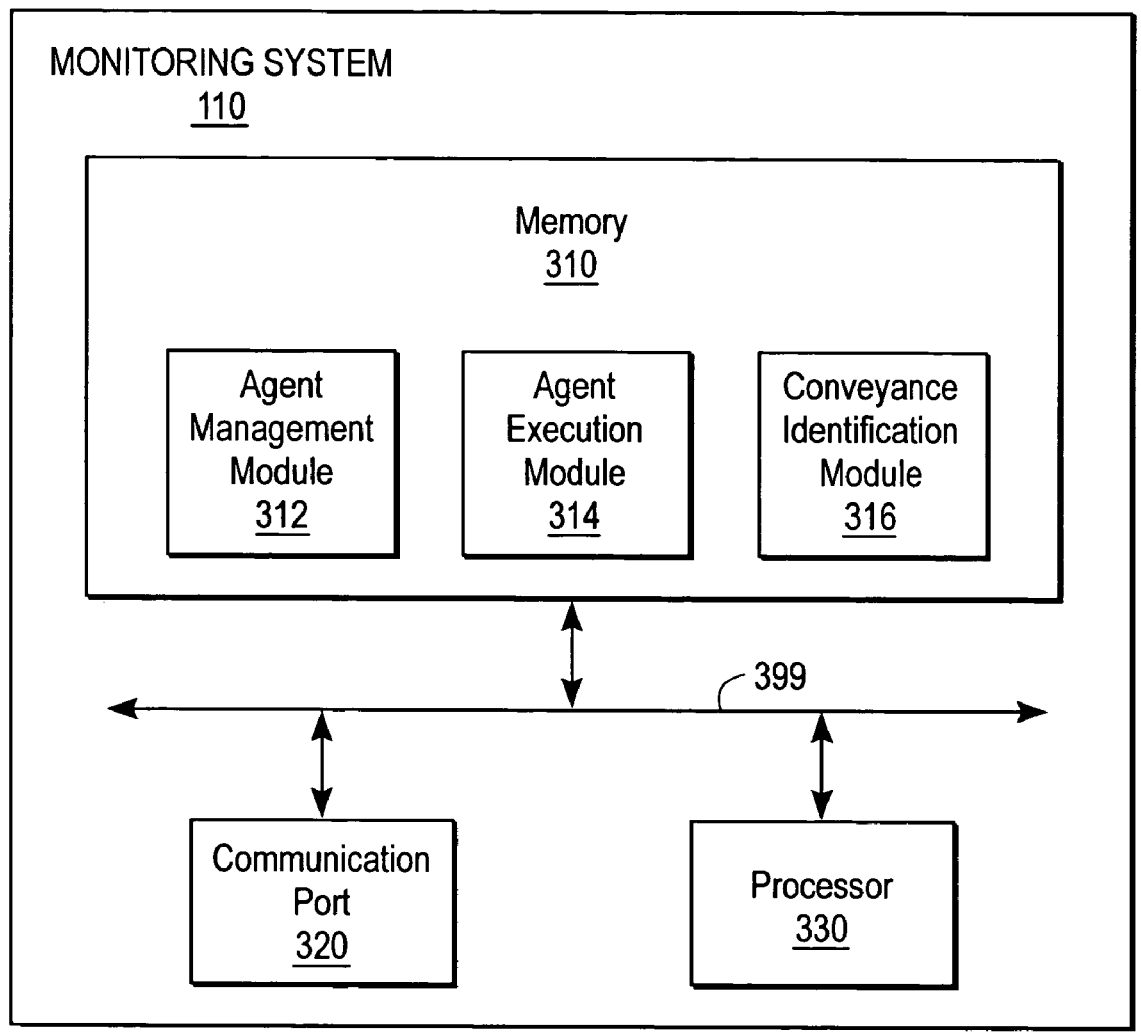
FIG. 3 is a block diagram illustrating a representative monitoring system according to one embodiment of the present invention.

FIG. 3 is a block diagram illustrating a representative monitoring system 110 according to one embodiment of the present invention. The monitoring system 110 comprises a memory 310, a communication port 320, and a processor 330. The memory 310 further comprises an agent management module 312, an agent execution module 314, and a conveyance identification module 316.

The agent management module 312 generates and distributes agents. The agent management module 312 associates information such as a tag identifier with an owner, a tag identifier with a conveyance, a conveyance with a tag identifier, and the like. The agent management module can encapsulate the information and upload to the federation directory 130 through the communication port 320. The agent management module 312 can also generate an agent equipped with necessary logic and/or data to remotely process the conveyance. Subsequently, the agent management module 312 can update the agent to reflect changes in policy such as a change in routing or a change in destination, or refresh expired agents.

The agent execution module 314 safely executes agents, for example, in an execution container. The agent execution module 314 can limit resource usage such as processor cycles and available memory usage. The agent execution module 314 can also partition agent execution to prevent malicious code from harming other software code present in the memory 310. For example, the agent execution module 314 may limit available API's (application program interfaces).

The conveyance identification module 316 matches agents with conveyances. The conveyance identification module 316 detects conveyances and requests conveyance identification information using, for example, automatic identification technology. The conveyance identification module 316 checks received agents for matching identification information. If there is no pre-loaded agent, the conveyance identification module 316 retrieves ownership information from the federated directory 130. The conveyance identification module 316 uses the ownership information to request the agent from the owner monitoring system 110.

The communication port 320 comprises physical, logical, analog and/or digital communication channels necessary to, for example, send and receive identification information, layer information, and the like. For example, the communication port 320 comprises an RF transceiver, a satellite transponder, a GPS (Geographic Positioning System) receiver, an Ethernet interface, a telephone interface, and the like. The communication port 320 can also translate information between formats such as between a proprietary information format and EDI (Electronic Data Interchange). The processor 330 comprises, for example, a CPU (Central Processing Unit), a mobile CPU, a controller, or other device to execute instructions.

Figure 4:
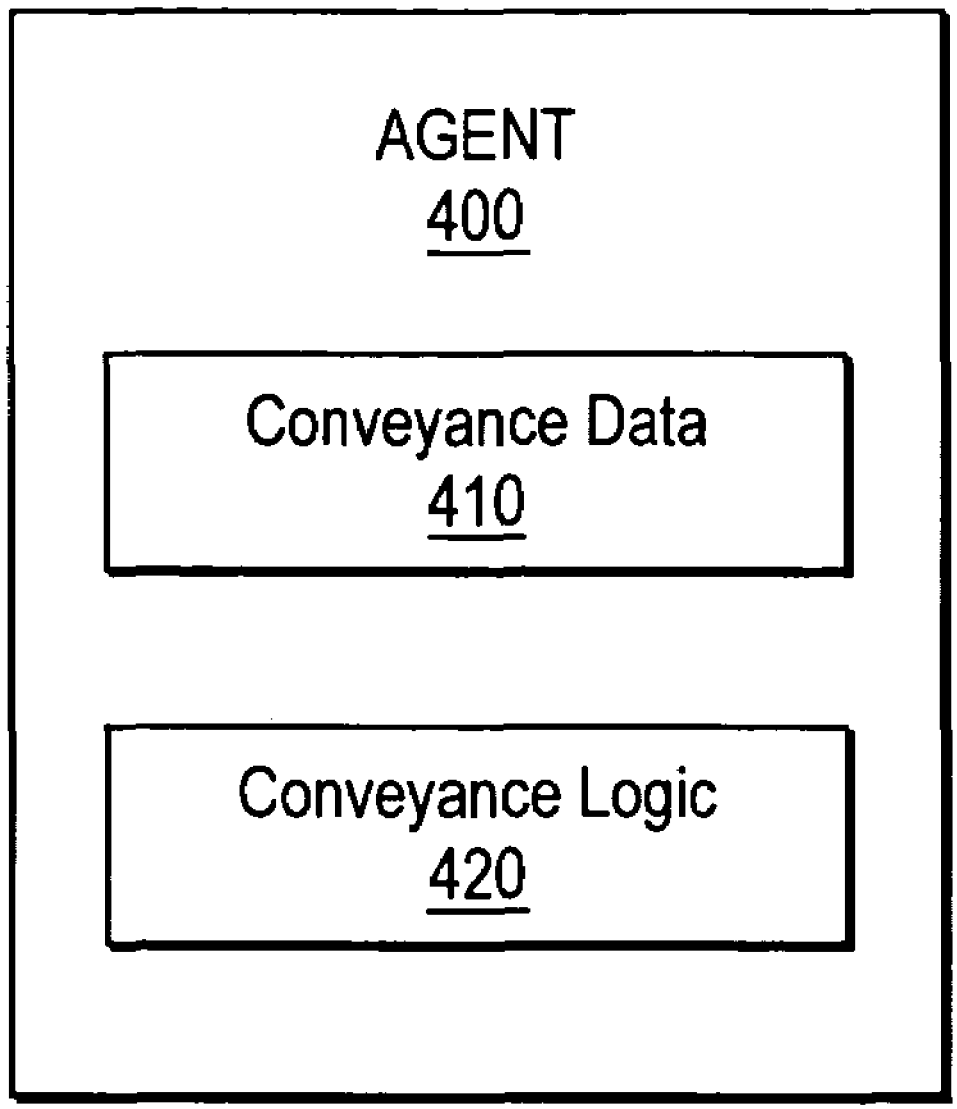
FIG. 4 is a block diagram illustrating a representative agent according to one embodiment of the present invention.

FIG. 4 is a block diagram illustrating a representative agent 400 according to one embodiment of the present invention. The agent 400 comprises conveyance data 410 and conveyance logic 420. Depending on its contents, the agent 400 can be embodied in various forms such as software code, a script, a set of messages, a token, and the like. Preferably, the agent 400 is platform-independent and, thus, capable of operating in any operating system or underlying hardware by, for example, running Java code in Java Virtual Machines, using XML format, and the like. Additionally, the agent can be version independent, or backwards compatible.

The conveyance data 410 comprises general data for conveyance monitoring and/or data specific to a corresponding conveyance. The general data can comprise standard information used across conveyances. On the other hand, the specific data can comprise information particular to the conveyance such as contents, routing information, destination information, allowable temperature ranges for the contents, and the like. The conveyance data 410 can be formatted in XML, network packets, and the like.

The conveyance logic 410 comprises general logic and/or specific logic. The logic can be, for example, a state machine that uses inputs from the conveyance data 410 or the conveyance itself, and outputs a state. The resulting state can be reported back to an agent owner for monitoring. The conveyance logic 410 can call API's on the hosting monitoring system 110 to access existing processes. For example, the conveyance logic 420 can be implemented in Java running on a Java Virtual Machine.

Figure 5:
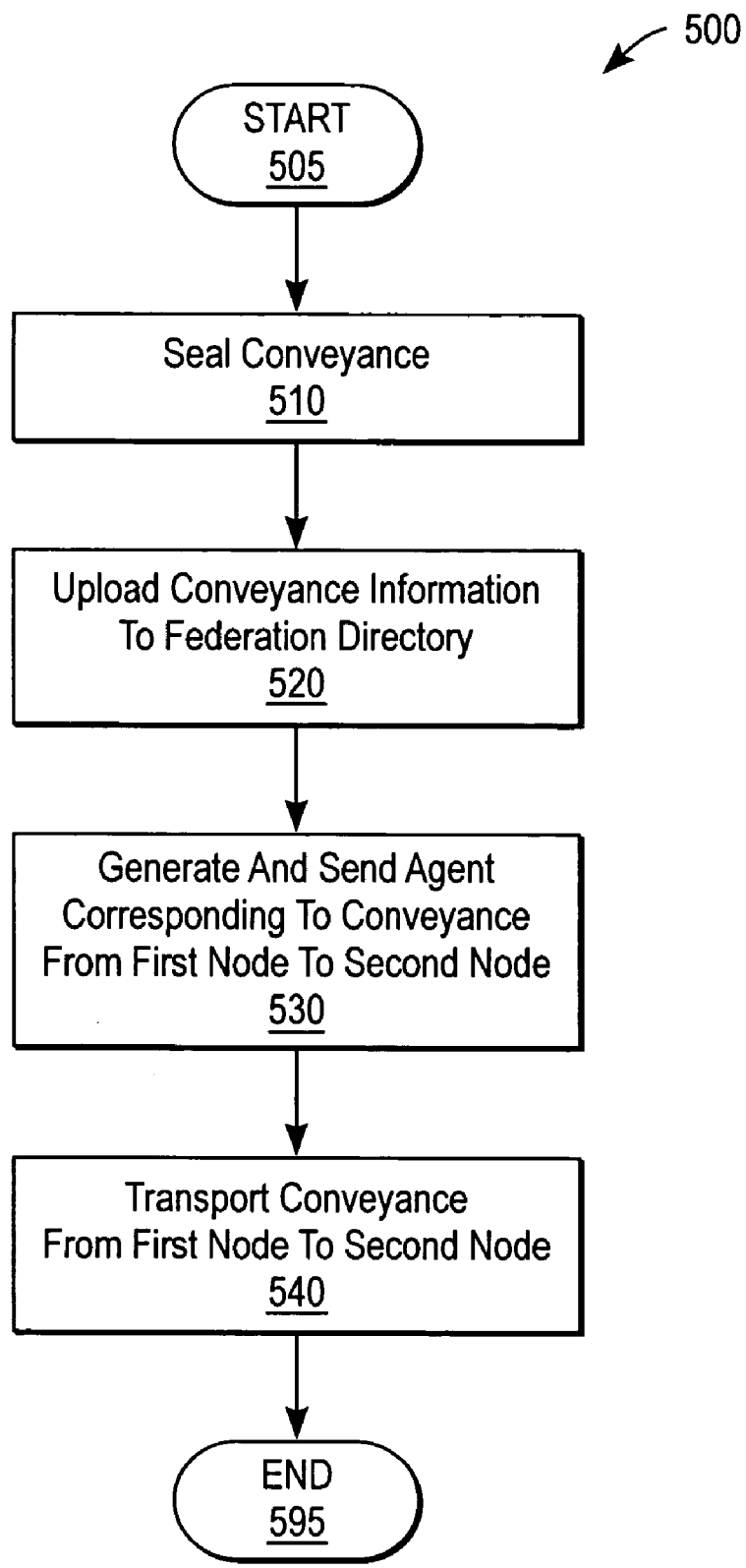
FIG. 5 is a flow chart illustrating a method for monitoring conveyances and/or their contents at a second node from a first node in a federated monitoring system according to one embodiment of the present invention.

FIG. 5 is a flow chart illustrating a method 500 for monitoring conveyances at a second node from a first node of a federated monitoring system 100 according to one embodiment of the present invention. The nodes can comprise, for example, any of the monitoring systems 110a-c in communication with any of the ports 115a-c, a shipper 105, a consignee 125, a distribution center, a rail terminal, a warehouse, a manufacturing plant, a retail store, and the like. When the shipper seals 510 the conveyance, a seal key is associated with the conveyance. The agent uploads 520 conveyance information such as the seal key, ownership information, and the like, to the federation directory 130. As a result, any monitoring system 110 in communication with the federation directory 130 can gain access to an agent corresponding to the conveyance from the owner.

The agent management module 312 generates 530 and sends an agent corresponding to the conveyance from the first node to the second node. The agent comprises logic and/or data that can be generally related to conveyances or specifically related to the corresponding conveyance. In one embodiment, the agent management module 312 sends slave agents to each port in a container route, and sends a master agent to the next port. A vessel transports 540 the conveyance from the first node to the second node.

Figure 6:
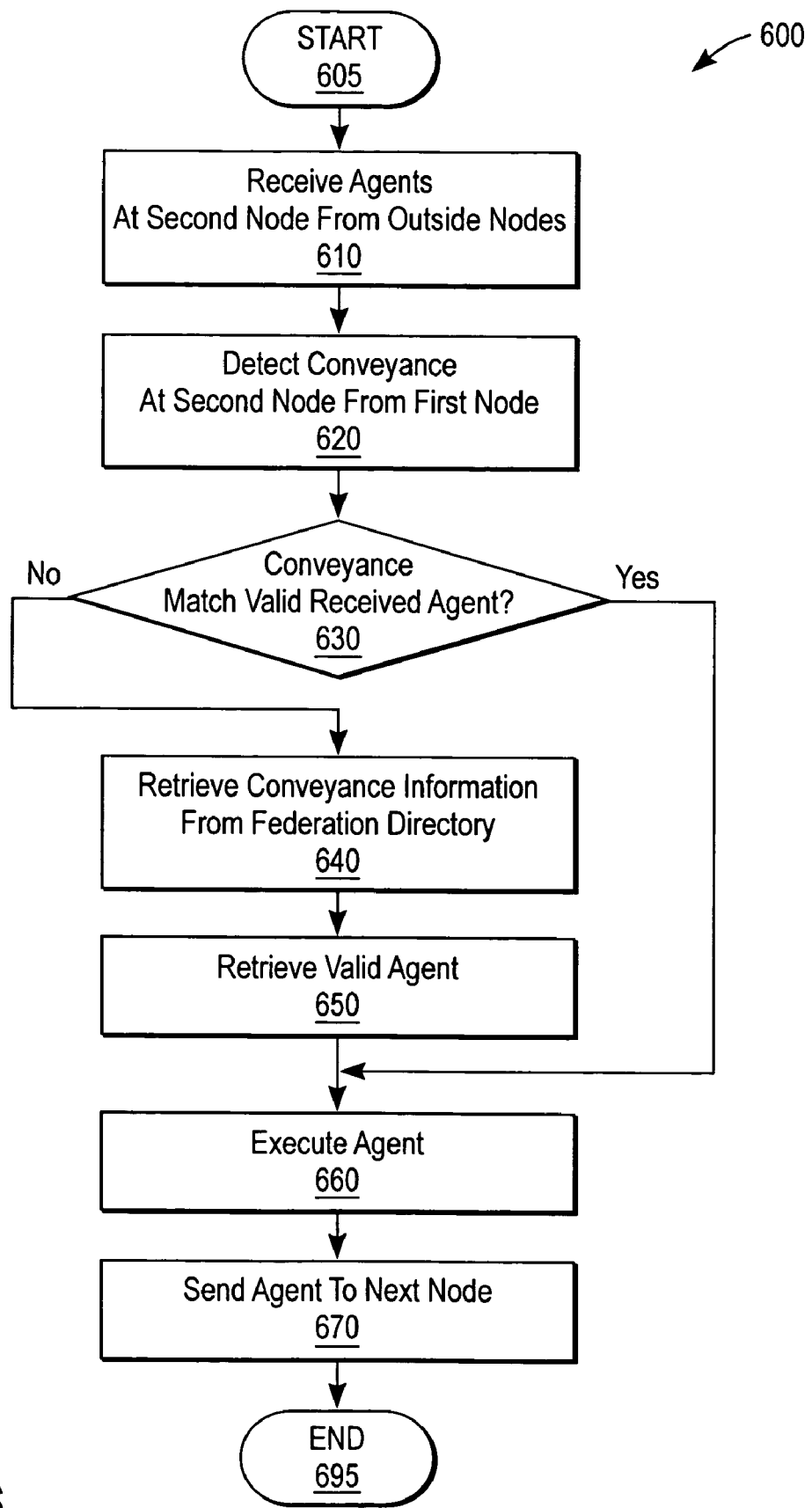
FIG. 6 is a flow chart illustrating a method for processing an agent at a second node according to one embodiment of the present invention.

FIG. 6 is a flow chart illustrating a method 600 for processing an agent at the second node according to one embodiment of the present invention. The second node receives 610 agents at the first node and other outside nodes. The second node also detects 620 the conveyance when it arrives from the first node. In one embodiment, the second node comprises a reader that detects tags or other automatic identification technology within range and sends a signal to a second monitoring system 110 within the second node.

The conveyance identification module 316 checks received agents against a tag identification 630. If there is no matching agent, the conveyance is an unidentified or unexpected conveyance. In this case, the conveyance identification module 316 retrieves 640 conveyance information from the federation directory 130. As such, the federation directory uses the tag identification as a key to look up ownership information. The conveyance identification module 316 can then retrieve 530 a valid agent from the owner monitoring system 110. In one embodiment, the monitoring system 110 has received a corresponding agent that is no longer valid. For example, if the conveyance does not arrive within a window, the agent can expire. In this case, the conveyance identification module 316 requests an updated agent from the owner monitoring system 110.

The agent execution module 314 at the second node executes 660 the agent. In one example, the agent execution module 314 executes within an agent execution module 314. The execution varies depending upon the agent and its permissions at the second node. The agent can execute its own logic by applying business rules to determine conditions of the conveyance and/or its contents. The execution can also be dependent on resources the monitoring system 110 in that the agent merely provides data such as reference information for conditions. In one embodiment, the execution comprises processing message packets. After execution, in one embodiment, results are sent back to the first monitoring system 110.

In an embodiment in which master agents are needed to activate passive agent, after execution, the second node sends 670 the agent to a next node. One of ordinary skill in the art will recognize that similar methods can be applied at subsequent nodes.

We claim:

1. A method of monitoring physical assets from nodes in heterogeneous monitoring systems, comprising the steps of:
   receiving at an agent execution module an agent from a first node, the agent associated with a physical asset transported from the first node to a second node;
   detecting the physical asset at an agent identification module;
   executing by the agent execution module the agent at the second node to determine a condition of the physical asset;
   detecting by the agent an unidentified physical asset; and
   retrieving by the agent identification information associated with the unidentified physical asset,
   wherein detecting the physical asset comprises identifying the unidentified physical asset as the physical asset.

2. The method of claim 1, wherein the step of receiving the agent comprises:

receiving the agent from the first node, the agent having logic to implement rules to determine the condition of the physical asset.

3. The method of claim 1, wherein the step of receiving the agent comprises:
receiving the agent from the first node, the agent having data comprising one from the group containing: location information, logistics information, physical information, security information, and environmental information.

4. The method of claim 1, further comprising:
generating the agent at the first node.

5. The method of claim 1, wherein the physical asset comprises a conveyance.

6. A method of monitoring physical assets from nodes in heterogeneous monitoring systems, comprising the steps of:
receiving at an agent execution modules an agent from a first node, the agent associated with a physical asset transported from the first node to a second node;
detecting the physical asset at an agent identification module;
executing by the agent execution module the agent at the second node to determine a condition of the physical asset;
detecting by the agent an unidentified physical asset;
retrieving by the agent identification information associated with the unidentified physical asset; and
retrieving by the agent origin information based on the identification information,
wherein the step of receiving the agent further comprises requesting the agent from the first node based on the origin information and the identification information.

7. The method of claim 6, wherein the step of receiving the agent comprises:
receiving the agent from the first node, the agent having logic to implement rules to determine the condition of the physical asset.

8. The method of claim 6, wherein the step of receiving the agent comprises:
receiving the agent from the first node, the agent having data comprising one from the group containing: location information, logistics information, physical information, security information, and environmental information.

9. The method of claim 6, further comprising:
generating the agent at the first node.

10. The method of claim 6, wherein the physical asset comprises a conveyance.

11. A node within a plurality of nodes in heterogeneous monitoring systems for monitoring physical assets, comprising:
an agent identification module for detecting a physical asset;
an agent execution module for receiving an agent from an origin node, the agent associated with the physical asset transported from the origin node to a second node, the agent execution module executing the agent at the second node to determine a condition of the physical asset; and
wherein the agent detects an unidentified physical asset, and retrieves identification information associated with the unidentified physical asset to identify the unidentified physical asset as the physical asset.

12. The node of claim 11, wherein the agent comprises logic to implement rules to determine the condition of the physical asset.

13. The node of claim 11, wherein the agent comprises data associated with the physical asset, the data comprising one from the group containing: location information, logistics information, physical information, security information, and environmental information.

14. The node of claim 11, wherein the physical asset comprises a conveyance.

15. A node within a plurality of nodes in heterogeneous monitoring systems for monitoring physical assets, comprising:
an agent identification module for detecting a physical asset;
an agent execution module for receiving an agent from an origin node, the agent associated with the physical asset transported from the origin node to a second node, the agent execution module executing the agent at the second node to determine a condition of the physical asset; and
wherein the agent detects an unidentified asset, retrieves identification information associated with the unidentified physical asset, retrieves origin information from a federated directory based on the identification information, and requests the agent from the origin node based on the origin information and the identification information.

16. The node of claim 15, wherein the agent comprises logic to implement rules to determine the condition of the physical asset.

17. The node of claim 15, wherein the agent comprises data associated with the physical asset, the data comprising one from the group containing: location information, logistics information, physical information, security information, and environmental information.

18. The node of claim 15, wherein the physical asset comprises a conveyance.

19. A computer product, comprising:
a computer-readable medium having computer program instructions and data embodied thereon for monitoring physical assets from nodes of heterogeneous monitoring systems, comprising the steps of:
receiving an agent from a first node, the agent associated with a physical asset transported from the first node to a second node;
detecting the physical asset;
executing the agent at the second node to determine a condition of the physical asset;
detecting an unidentified physical asset; and
retrieving identification information associated with the unidentified physical asset,
wherein detecting the physical asset comprises identifying the unidentified physical asset as the physical asset.

20. The computer product of claim 19, wherein the step of receiving the agent comprises:
receiving the agent from the first node, the agent having logic to implement rules to determine the condition of the physical asset.

21. The computer product of claim 19, wherein the step of receiving the agent comprises:
receiving the agent from the first node, the agent having data comprising one from the group containing: location information, logistics information, physical information, security information, and environmental information.

22. The computer product of claim 19, wherein the physical asset comprises a conveyance.

23. A computer product, comprising:

a computer-readable medium having computer program instructions and data embodied thereon for monitoring physical assets from nodes of heterogeneous monitoring systems, comprising the steps of:

receiving an agent from a first node, the agent associated with a physical asset transported from the first node to a second node;

detecting the physical asset;

executing the agent at the second node to determine a condition of the physical asset;

detecting an unidentified physical asset;

retrieving identification information associated with the unidentified physical asset; and retrieving origin information based on the identification information, wherein the step of receiving the agent further comprises requesting the agent from the first node based on the origin information and the identification information.

24. The computer product of claim 23, wherein the step of receiving the agent comprises:

receiving the agent from the first node, the agent having logic to implement rules to determine the condition of the physical asset.

25. The computer product of claim 23, wherein the step of receiving the agent comprises:

receiving the agent from the first node, the agent having data comprising one from the group containing: location information, logistics information, physical information, security information, and environmental information.

26. The computer product of claim 23, wherein the physical asset comprises a conveyance.

* * * * *